(12) United States Patent
Matsumiya et al.

(10) Patent No.: US 6,594,915 B2
(45) Date of Patent: Jul. 22, 2003

(54) CALIPER AND CALIPER GRIP

(75) Inventors: Sadayuki Matsumiya, Sagamihara (JP); Shigeru Ohtani, Kawasaki (JP); Jun Odake, Ohta-ku (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/041,439

(22) Filed: Jan. 8, 2002

(65) Prior Publication Data

US 2002/0100183 A1 Aug. 1, 2002

(30) Foreign Application Priority Data

Jan. 31, 2001 (JP) ........................................ 2001-023857

(51) Int. Cl.[7] ................................................ G01B 5/00
(52) U.S. Cl. .............................. 33/783; 33/794; 33/795; 33/796
(58) Field of Search .......................... 33/783, 784, 787, 33/788, 789, 791, 792, 793, 794, 795, 796, 802, 806, 810, 811, 812, 779, 780, 781, 782

(56) References Cited

U.S. PATENT DOCUMENTS

| | | | |
|---|---|---|---|
| 1,196,703 A | * | 8/1916 | Kraut ............................ 33/787 |
| 4,604,808 A | | 8/1986 | Jeannet et al. |
| 5,454,174 A | * | 10/1995 | Lewington et al. ............ 33/787 |
| 5,483,751 A | | 1/1996 | Kodato |
| 6,430,830 B1 | * | 8/2002 | Segal ............................ 33/806 |

FOREIGN PATENT DOCUMENTS

| | | | | |
|---|---|---|---|---|
| CH | 584 881 A | | 2/1977 | |
| GB | 2 067 761 A | | 7/1981 | |
| JP | 361213602 A | * | 3/1985 | ................... 33/784 |
| JP | 361213603 A | * | 3/1985 | ................... 33/784 |
| JP | 361213604 A | * | 3/1985 | ................... 33/784 |
| JP | 406185904 A | * | 8/1992 | ................... 33/810 |
| JP | 07027501 A | | 1/1995 | |
| JP | 09049721 A | | 2/1997 | |

* cited by examiner

Primary Examiner—Christopher W. Fulton
Assistant Examiner—Travis Reis
(74) Attorney, Agent, or Firm—Rankin, Hill, Porter & Clark LLP (57) ABSTRACT

A caliper has a main scale (1) having an inside-measuring jaw (2) and an outside-measuring jaw (3) and a slider (11) having an inside-measuring jaw (12) and an outside-measuring jaw (13) further includes a tube-shaped grip (30) provided on an end of the main scale (1) capable of movement in a longitudinal direction of the main scale (1), the grip (30) including a means for fixing the grip (30) relative to the main scale (1).

8 Claims, 7 Drawing Sheets

CALIPER AND CALIPER GRIP

BACKGROUND OF THE INVENTION

1. Field of the Invention

The present invention relates to a caliper and a caliper grip. More specifically, it relates to a caliper having a grip movable relative to a main scale and a caliper grip.

2. Description of Related Art

Vernier scale caliper having a main scale provided with main scale graduations formed along the longitudinal direction of the main scale and a slider with vernier graduations formed thereon, a dial display caliper that converts a movement of a slider into rotation of a dial pointer, and a digital display caliper that converts a movement of the slider into an electric signal by a photoelectric, an electrostatic or a magnetic encoder and digitally displays the movement in accordance with the signal on a digital display are conventionally known.

In measuring with such conventional calipers, workpiece is grabbed by one hand and a main scale is grasped with the other hand, where a slider is moved along the main scale while applying thumb of the other hand to the slider to bring an inner or outer jaw provided to the main scale and the slider into contact with the target portions of the workpiece. The dimension of the workpiece etc. can be obtained from the main scale graduation and vernier graduation (in vernier scale caliper), dial pointer (in dial display caliper) or indication on the digital display (in digital display caliper).

However, since the slider has to be moved while grasping the main scale with one hand during measurement, following disadvantages occurred in the conventional calipers.

(a) Since the main scale has rectangular cross section in order to allow the movement of the slider, it is difficult to hold the main scale with the one hand. Especially, when the workpiece is to be measured while moving the slider is moved to a point around effective measurement range relative to the main scale, little space is left on the main scale to be held. For instance, when a caliper having effective measurement range of 10 cm is used to measure a dimension around 10 cm, since the slider is moved to a position near a distal end of the main scale, little space is left on the main scale to be grasped.

(b) Further, since the measurement is conducted while directly holding the main scale with one hand, the heat of the hand is transferred to the main scale, which can influence on measurement result. Especially, since electrode is buried along the longitudinal direction of the main scale in a digital display caliper, the heat of the hand can influence on the measurement accuracy.

(c) The worker may sometimes hold the main scale with hand adhered with oil in a factory. In such environment, the graduation of vernier scale caliper may get dirty by oil etc., so that legibility is deteriorated. Further, when a worker conducts measurement while holding the main scale with hand adhered with chip etc., the chip may damage the electrode of digital display caliper.

Accordingly, the applicant of the present application has proposed a caliper for overcoming the above disadvantages (see U.S. Pat. No. 5,483,751), in which a tube-shaped synthetic-resin cover covering the main scale is attached to the slider.

According to the above arrangement, the synthetic-resin cover is held with one hand and the slider is moved along the longitudinal direction of the main scale while applying the finger cushion of the thumb of the hand to a press roller attached to the slider, thereby bringing the measuring jaw into contact with a target portion of a workpiece.

Accordingly, since measurement can be conducted while holding the tube-shaped cover having a design enabling easy holding without holding the main scale, the above disadvantage of difficulty in holding the rectangular-cross-sectional main scale can be avoided. There is no problem of little space for holding the main scale in measuring a dimension around the effective measurement range. Further, since synthetic resin of low thermal conductivity is used for the tube-shaped cover, the heat is hardly transferred to the main scale. Since the cover is held without directly holding the main scale, the contamination by oil and chip adhered on hand can be avoided.

However, since the slider has to be specially machined in attaching the cover to the slider in the conventional caliper (U.S. Pat. No. 5,483,751), troublesome work and considerable production cost are necessary therefor.

SUMMARY OF THE INVENTION

An object of the present invention is to provide a caliper and a caliper grip capable of eliminating the above conventional disadvantages, superior in operability and readability, with the measurement accuracy thereof being hardly influenced by heat from hand and superior in processing work and production cost.

In order to achieve the above object, the caliper and caliper grip of the present invention has the following arrangement.

A caliper according to an aspect of the present invention has: a main scale having a first measuring jaw; a slider movable along a longitudinal direction of the main scale and having a second measuring jaw to be in contact with a workpiece together with the first measuring jaw; and a tube-shaped grip provided on a side of the main scale opposite to the measuring jaws relative to the slider, the grip covering the main scale and being movable in the longitudinal direction of the main scale.

According to the above arrangement, after displacing the grip to a position capable of measuring a dimension slightly greater than a target portion, the grip is held with one hand and the slider is moved while pushing the slider with the thumb of the one hand. While the measuring jaw of the slider and the measuring jaw of the main scale are in contact with the workpiece by moving the slider, the dimension between the measuring jaws, i.e. the dimension of the workpiece, is read. The dimension of the workpiece is read by a main graduation of the main scale and a vernier graduation of the slider, the graduation coincident with the pointer of a dial of a dial display caliper and a numeral on a digital display of a dial display caliper.

Accordingly, since the slider can be manipulated while holding the grip, difficulty in holding the rectangular-cross-sectional main scale and the problem of little holding space on the main scale when the slider is moved relative to the main scale to a point around the effective measurement range can be resolved. Since the heat is not directly transferred to the main scale by holding the grip with hand, deterioration of dimension accuracy by heat can be reduced. Since it is not necessary to hold the main scale directly with one hand, difficulty in reading the graduation of the vernier scale caliper caused by holding the main scale with oil-stained hand and damage on the electrode caused by chips adhered on hand can be prevented. Since the grip is not necessary to be connected to the slider, no work and processing for connecting the grip to the slider is required, thus reducing cost therefor.

In the above caliper, a plate spring slidable relative to the main scale when the grip is moved in the longitudinal direction of the main scale may preferably be provided on an inner wall of the grip.

According to the above arrangement, since the spring force can be changed by adjusting shape and material of the spring portion of the plate spring, the grip can be adjusted to be stilled in measuring dimension and moved with relatively low force during movement.

In the caliper according to the above aspect of the present invention, a rib slidable relative to the main scale when the grip is moved in the longitudinal direction of the main scale may preferably be provided on an inner wall of the grip.

According to the above arrangement, since the pressing force of the grip toward the main scale can be changed in accordance with the size and shape of the rib, the grip can be adjusted to be stilled in measuring dimension and moved with relatively low force during movement.

In the caliper according to the above aspect of the present invention, a slide member independent of the grip may preferably be provided between the grip and the main scale.

According to the above arrangement, since original slide condition can be recovered by exchanging the slide member as one of the components of the grip when the slide member is worn down, the cost can be reduced as compared to an arrangement for exchanging the entire grip.

In the caliper according to the above aspect of the present invention, the grip may preferably include a grip body covering at least a part of the main scale and a movable member turnably supported by the grip body through a turn shaft and having an end adapted to be in contact with the main scale, and a biasing means for biasing the movable member in a direction for the end of the movable member to be in contact with the main scale.

According to the above arrangement, in moving the grip, the movable member is turned in a direction for an end of the movable member to be away from the main scale against the biasing means and the grip is moved in the longitudinal direction of the main scale. Since the grip is moved while the movable member is out of contact with the main scale, no abrasion is caused by slide movement and the grip can be moved with low force. When the movable member is turned by the biasing means at a desired position, an end of the movable member is in contact with the main scale and the grip is stilled at the position. The slider can be moved by holding the grip at the position. Even when the grip has been assembled, the main scale can be inserted between the grip body and the movable member by turning the movable member against the biasing means in a direction for an end to move away from the main scale, so that the grip can be easily attached to various existing calipers only by turning the movable member at a desired position by the biasing means and the grip can be detached from the caliper only by turning the movable member against the biasing means.

In the caliper according to the above aspect of the present invention, a pair of holding portions for holding the main scale and slidable relative to the main scale may preferably be formed inside the grip, a first grip component including a first holding portion of the pair of holding portions may preferably be displaceable relative to a second grip component including a second holding portion of the pair of holding portions in a direction for the first holding portion to move away from the second holding portion, and a fitting for mutually engaging the first grip component and the second grip component when the main scale is held by the pair of holding portions may preferably be provided.

According to the above arrangement, since the gap between the pair of holding portions is enlarged by displacing the first grip component in a direction for widening the gap between the holding portions, the main scale can be inserted into the gap. After the first grip component is displaced to the second grip component in a direction for the gap between the holding portions to return to original condition, both of the grip components are mutually engaged by the fitting. Then, the pair of holding portions hold the main scale, so that the grip can be stilled at any position relative to the main scale of the caliper and can be moved with a relatively low force during movement.

Accordingly, the grip can be attached and detached to existing calipers without special processing and the grip can be stilled at any position relative to the main scale of the caliper and can be moved with a relatively low force during movement.

A caliper grip according to another aspect of the present invention is used for a caliper including a main scale having a first measuring jaw and a slider movable along a longitudinal direction of the main scale having a second measuring jaw to be in contact with a workpiece together with the first measuring jaw, in which the caliper grip is movable on the main scale and stoppable at a desired position on the main scale, the caliper grip being formed in a tube-shape covering the main scale.

According to the above arrangement, the same function and advantages as the caliper of the present invention can be obtained.

In the above, a pair of holding portions for holding the main scale and slidable relative to the main scale may preferably be formed inside the grip, a first grip component including a first holding portion of the pair of holding portions may preferably be displaceable relative to a second grip component including a second holding portion of the holding portions in a direction for the first holding portion to move away from the second holding portion, and a fitting for mutually engaging the first grip component and the second grip component when the main scale is held by the pair of holding portions may preferably be provided.

According to the above arrangement, the grip can be attached and detached to existing calipers without special processing and the grip can be stilled at any position relative to the main scale of the caliper and can be moved with a relatively low force during movement.

BRIEF DESCRIPTION OF THE DRAWINGS

FIGS. 6(A) to 6(C) are cross sections showing a primary portion of a caliper according to fifth embodiment of the present invention, in which

DETAILED DESCRIPTION OF PREFERRED EMBODIMENT(S)

Preferred embodiments of the present invention will be described below with reference to attached drawings. Incidentally, the same reference numerals will be attached to the same components in the following description, thereby omitting or simplifying description thereof.

[First Embodiment]

Figure 1:
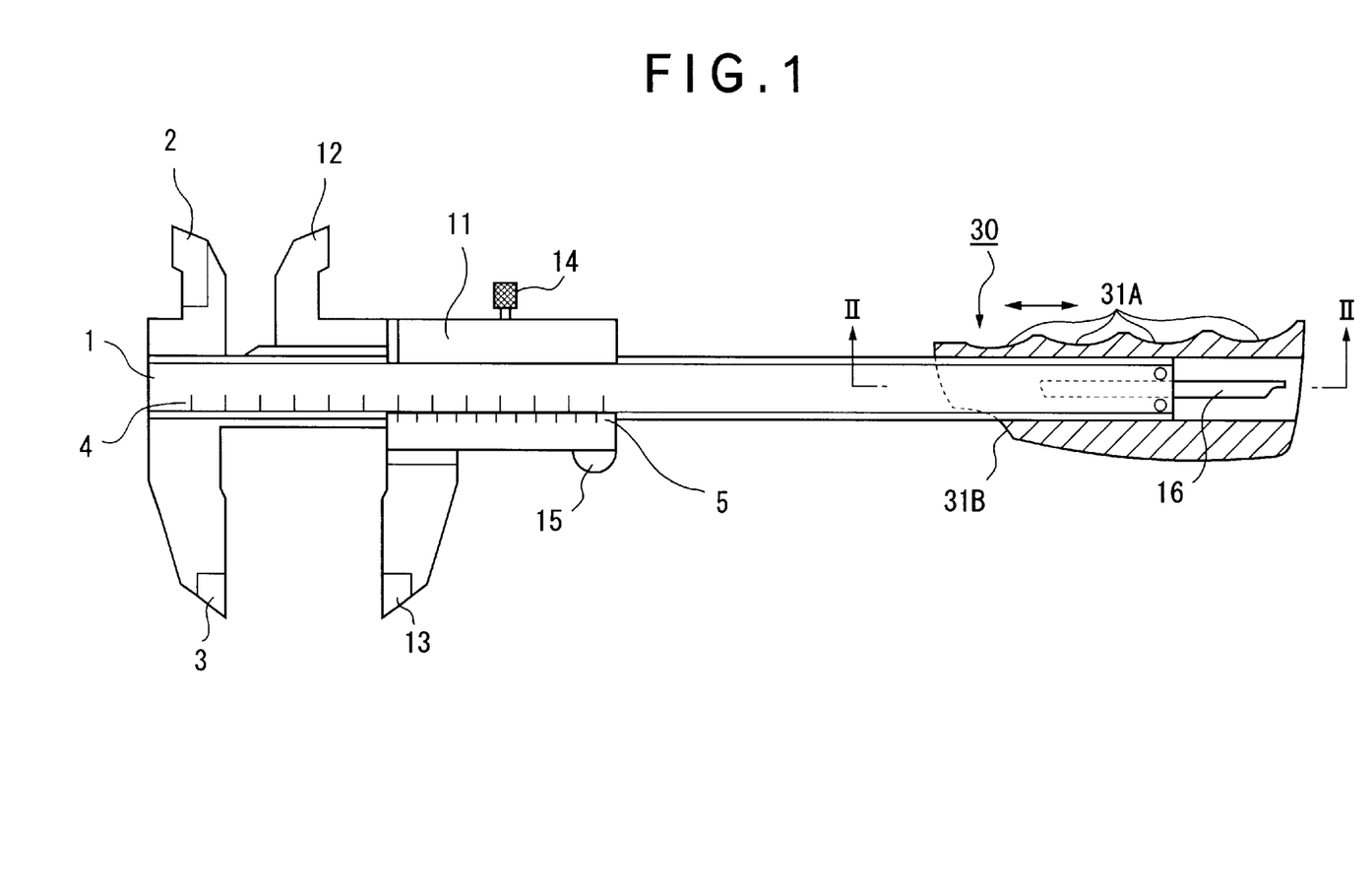
FIG. 1 is a front elevational view showing a vernier scale caliper according to first embodiment of the present invention.

FIG. 1 is a front elevational view of a vernier scale caliper. The vernier scale caliper shown in FIG. 1 has a main scale 1, a slider 11 movable along the longitudinal direction of the main scale 1 and a grip 30 movable in the longitudinal direction of the main scale 1 and stoppable at a desired position.

An inside-measuring jaw 2 and an outside-measuring jaw 3 are formed on the upper and lower periphery of one end of the main scale 1 integrally with the main scale 1. A depth-measuring depth bar 16 movable together with the slider 11 protrudes from the other end of the main scale 1. Incidentally, graduations 4 of millimeter unit are provided on the main scale 1 along the longitudinal direction thereof and vernier graduations 5 are provided on the slider 11.

The slider 11 has an inside-measuring jaw 12 for measuring an inside dimension of a workpiece together with the inside-measuring jaw 2 and an outside-measuring jaw 13 for measuring an outside dimension of the workpiece together with the outside-measuring jaw 3, a clamp screw 14 for fixing the slider 11 relative to the main scale 1, and a finger rest 15 used in moving the slider in the longitudinal direction of the main scale 1.

The grip 30 is made of plastic having enough rigidity not to be deformed when being grasped by hand, which is formed in a tube covering the main scale with both ends thereof being opened. A material of superior chemical resistance and heat resistance is used for the grip 30 considering environment of actual use. Four arcuate dents 31A where four fingers except for thumb are applied are formed on the upper end of the grip 30 for facilitating holding by hand. Further, arcuate dent 31B is formed on the lower side of the grip 30 under the slider 11 so that the thumb does not interfere when the thumb is stretched to the finger-rest 15 of the slider 11.

Figure 2:
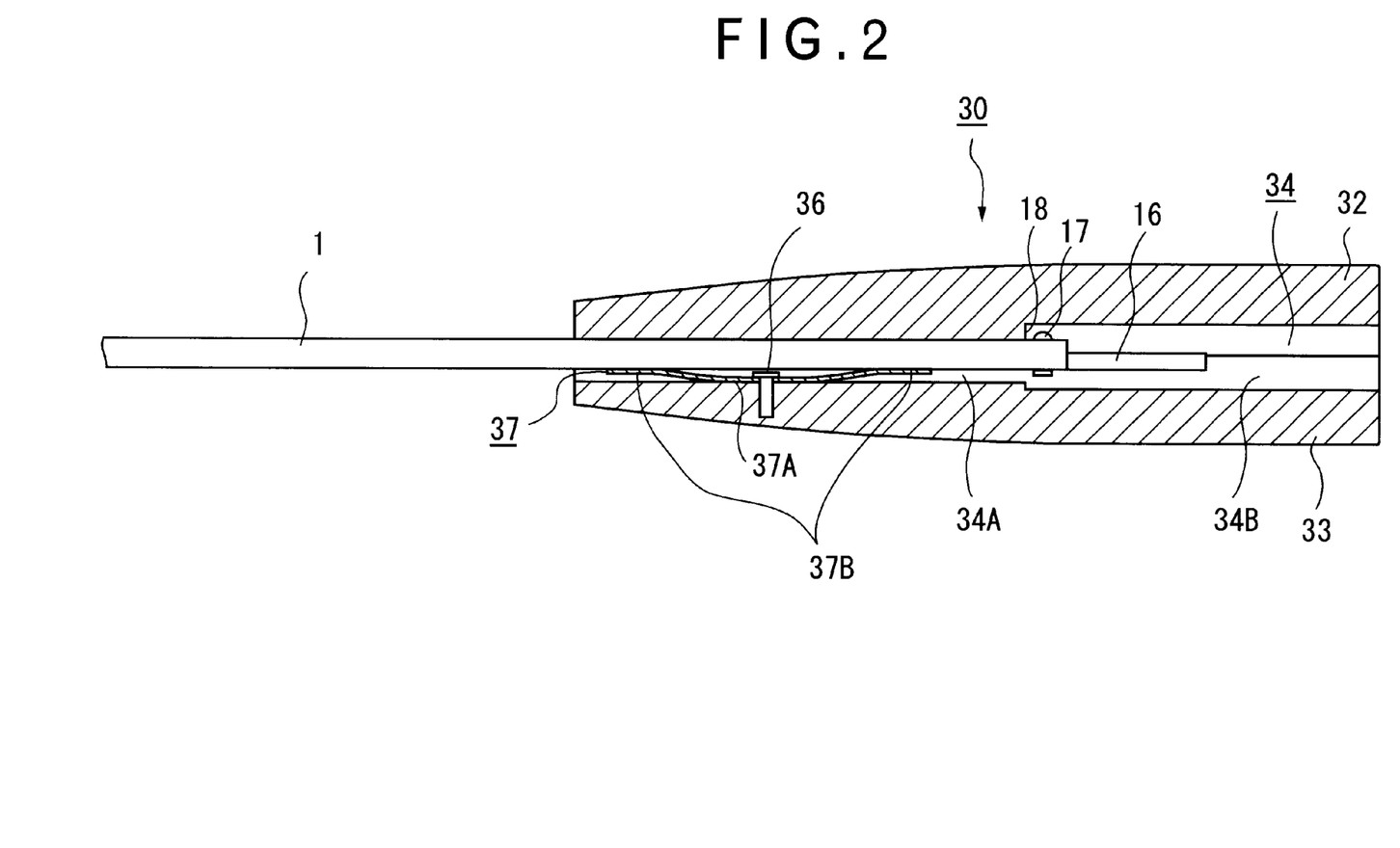
FIG. 2 is a cross section taken along II—II Line in FIG. 1.

FIG. 2 is a cross section taken along II—II line of FIG. 1. As shown in the figure, the grip 30 is constructed by bonding two components 32 and 33 separated substantially at the center of the main scale 1 in the thickness direction. A through hole 34 for the main scale 1 to be inserted is formed inside the grip 30. The through hole 34 is formed by connecting a first through hole 34A slightly wider than the thickness of the main scale 1 and a second through hole 34B wider than the first through hole 34A approximately at the longitudinal center of the grip 30, the first through hole 34A being located adjacent to the slider 11 relative to the second through hole 34B.

A projection 17 such as a screw is provided on the other end of the main scale 1, which is projected from the main scale 1 in the depth direction of the main scale 1. Accordingly, when the grip 30 is moved toward the other end of the main scale 1, the projection 17 engages to a step 18 formed at the connecting portion of the first through hole 34A and the second through hole 34B, thereby restricting the movement of the grip 30 toward the other end of the main scale 1.

A plate spring 37 is provided in the first through hole 34A between the component 33 and he backside of the main scale 1. A central portion 37A of the plate spring 37 is bent in an arch shape and both ends 37B of the plate spring 37 are in contact with the main scale 1. The central portion 37A of the plate spring 37 is fixed to the component 33 with a pin 37. The biasing force of the plate spring 37 is set so that the grip 30 can move in the longitudinal direction of the main scale in a relatively low force and stop in measuring dimension.

When a workpiece is measured, a grip 30 is held with one hand at the arcuate dents 31A provided on the grip 30 and the slider 11 is moved along the longitudinal direction of the main scale 1 while applying the finger cushion of the thumb of the hand on the finger rest 15, thereby bringing the inside-measuring jaw 12 or the outside-measuring jaw 13 into contact with the workpiece. The dimension of the workpiece can be measured by reading the vernier graduation 5 where the main scale graduation 4 and the vernier graduation 5 substantially coincide with each other. On the other hand, when a workpiece of around the effective measurement range is measured, the grip 30 is moved toward the other end of the main scale 1 for measurement. Since the measurement can be conducted while holding the grip 30, there is no problem of difficulty in holding the grip.

According to the above-described first embodiment, following advantages can be obtained.

(1) Since the measurement can be conducted while holding the grip 30, not the main scale 1, the caliper can be easily held as compared to an arrangement directly holding the main scale 1. The grip can be easily held since the four arcuate dents 31A for applying four fingers except for the thumb is formed on the upper side of the main scale 1 and the arcuate dent 31B for preventing interference with the thumb when the thumb is stretched to the slider 11 side is formed on the lower end of the main scale 1 on the side of the slider 11.

(2) Even when the measurement is conducted around the effective measurement range, holding space can be retained by moving the grip 30 toward the other end of the main scale 1.

(3) Since the grip 30 is held without directly holding the main scale 1 with hand, the influence of the heat transferred from the hand to the main scale 1 can be reduced. Especially, since the grip 30 is made of plastics in the first embodiment, good heat insulation can be obtained.

(4) Cutting oil can be adhered on the graduation of vernier scale caliper when a worker holds the main scale 1 with oil-adhered hand and the graduation becomes difficult to be read. However, since the main scale 1 is not directly held with the hand in the present embodiment, the above problem can be solved. In the same manner, the damage on electrodes of digital display caliper on account of chips can be avoided.

(5) Since no processing is required on the slider 11, production of the caliper can be facilitated as compared to the conventional cover-type caliper. Further, post-attachment can be easily conducted without much trouble and cost.

(6) The grip 30 can be moved with a relatively low force and can be stopped during measurement in the longitudinal direction of the main scale 1 by adjusting clamp force to the main scale 1 in accordance with deformation of the plate spring 37 provided to the grip 30.

[Second Embodiment]

Figure 3:
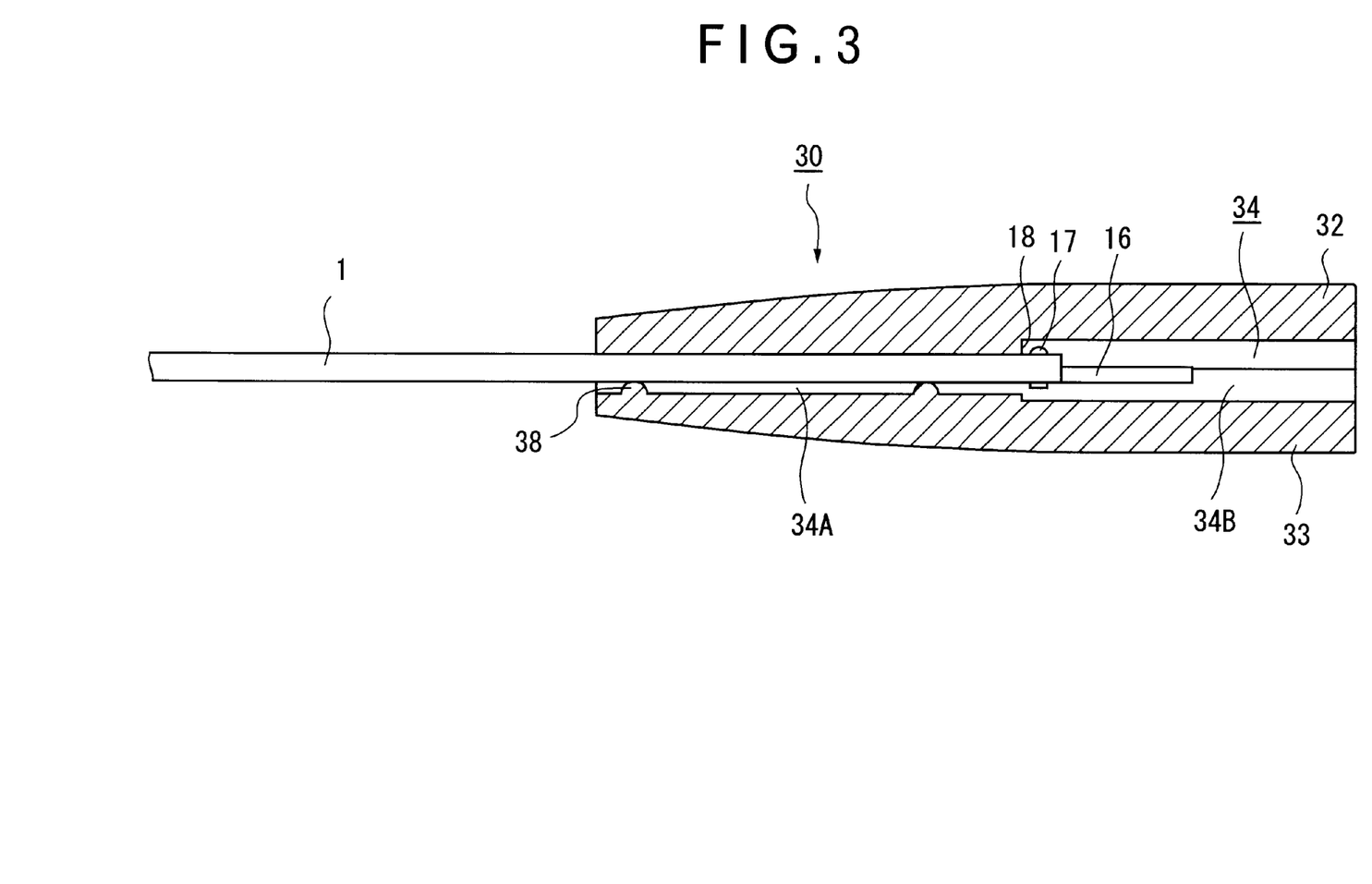
FIG. 3 is a cross section showing a primary portion of a caliper according to second embodiment of the present invention.

FIG. 3 shows a cross section of grip 30 according to a second embodiment of the present invention. The second embodiment differs from the first embodiment in the arrangement for holding the main scale 1.

The plate spring 37 is provided in the first embodiment and the central portion 37A of the plate spring 36 is fixed to the component 33 by the pin 36. In the second embodiment, two semi-cylindrical ribs 38 spaced apart in the longitudinal direction of the main scale 1 by a predetermined interval are provided on the component 33 side.

The longitudinal direction of the semi-cylindrical rib 38 is the same as the width direction of the main scale 1. The rib 38 is in contact with the main scale 1 over the entire width of the main scale 1. The main scale 1 is pressed toward the component 32 by the deformation of the rib 38. Incidentally, the pressing force of the rib 38 is set so that the grip 30 can move in the longitudinal direction of the main scale 1 in a relatively low force and can stop in measuring dimension.

According to the second embodiment, following advantage as well as the above advantages (1) to (6) can be obtained.

(7) Since the clamp force can be obtained by the deformation of the rib 38, the grip 30 can be set so that the grip 30 can move in the longitudinal direction of the main scale 1 with a relatively low force and can stop in measuring dimension by adjusting the size of the rib as a parameter.

[Third Embodiment]

Figure 4:
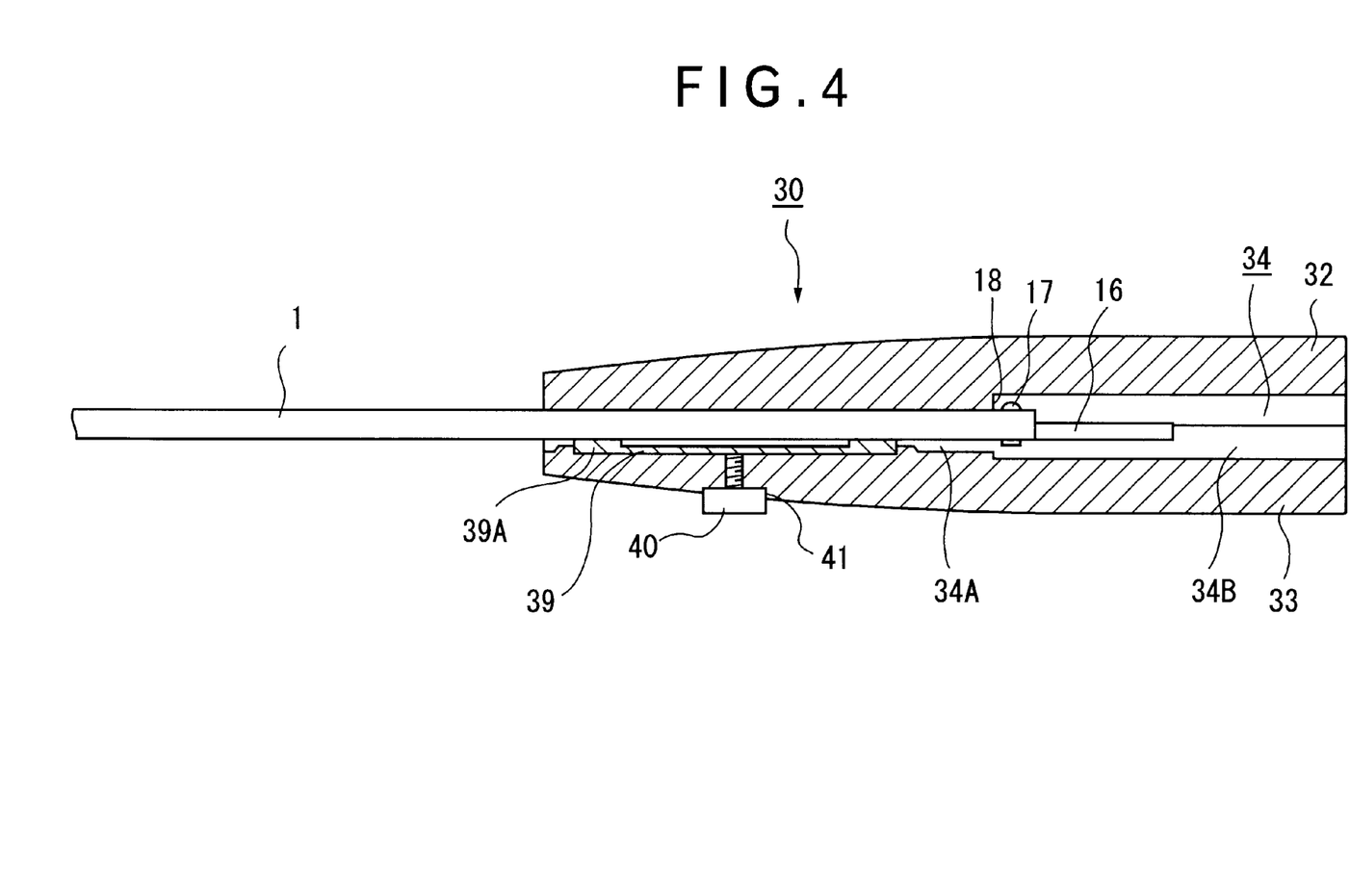
FIG. 4 is a cross section showing a primary portion of a caliper according to third embodiment of the present invention.

FIG. 4 shows a cross section of a grip 30 according to third embodiment of the present invention. The third embodiment differs from the first and the second embodiments in the arrangement for holding the main scale 1.

In contrast to the arrangement of the first embodiment using the plate spring 37 and the second embodiment using the rib 38, a slide member 39 in contact with the main scale 1 at two points on the component 33 side in the first through hole 34 is provided as a separate body in the third embodiment.

The slide member is a flat plate extending in the longitudinal direction of the main scale 1 and having recessed cross section. The outside bottom center of the slide member 39 is pushed by a fixing screw 40 to bring two projections 39A of the slide member 39 into contact with the main scale 1. A female screw is cut on the grip 30 for the fixing screw 40 to press the slide member 39. A spot facing hole 41 is provided on the component 33 for the fixing screw 40 not to greatly protrude from the grip 30. The pressing force of the slide member 39 is set so that the grip 30 can move in the longitudinal direction of the main scale 1 in a relatively low force and can stop in measuring dimension.

According to the third embodiment, following advantages as well as the above advantages (1) to (6) can be obtained.

(8) Since the clamp force of the slide member 39 toward the main scale 1 can be adjusted by the fixing screw 40, the grip 30 can be set so that the grip 30 moves in the longitudinal direction of the main scale 1 with a relatively low force.

(9) Since the slide member 39 can return to original slide condition by exchanging the slide member 39 as one of the components of the grip 30 even when the slide member 39 is worn down, the maintenance of the caliper can be inexpensively conducted as compared with an arrangement exchanging the entire grip 30.

(10) Though the thickness of the grip 30 around the position for the fixing screw 40 to be screwed is reduced toward the slider 11, since the longitudinal direction of the fixing screw 40 is perpendicular to the bottom surface of the spot facing hole 41, the protrusion length of the fixing screw 40 from the surface of the grip 30 can be reduced, and the fixing screw 40 can be accommodated below the surface of the grip 30. When the fixing screw 40 is accommodated under the surface of the grip 30, the damage of the plastic male screw caused by hooking the fixing screw 40 to some objects can be prevented.

[Fourth Embodiment]

Figure 5A:
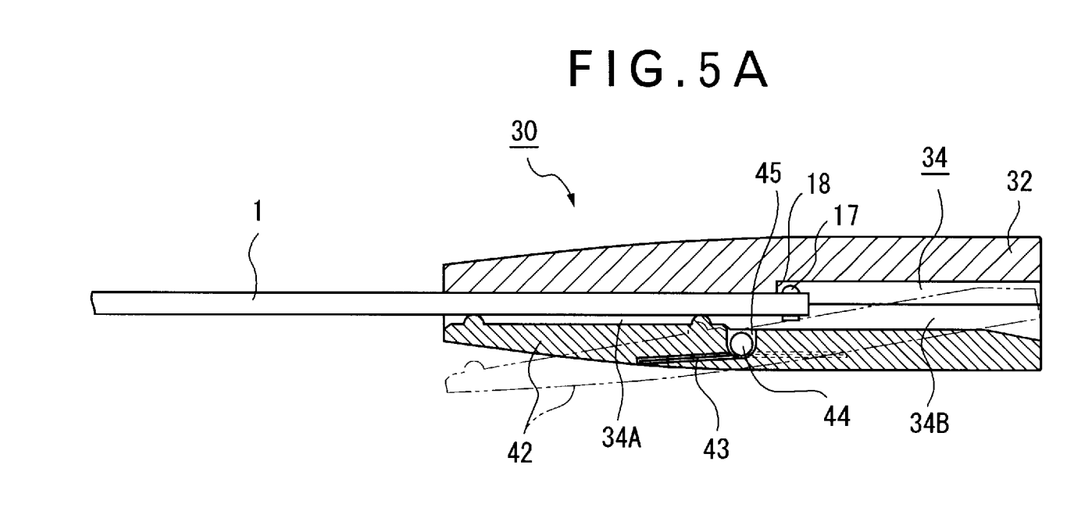
FIG. 5 is a cross section showing a primary portion of a caliper according to fourth embodiment of the present invention.
Figure 5B:
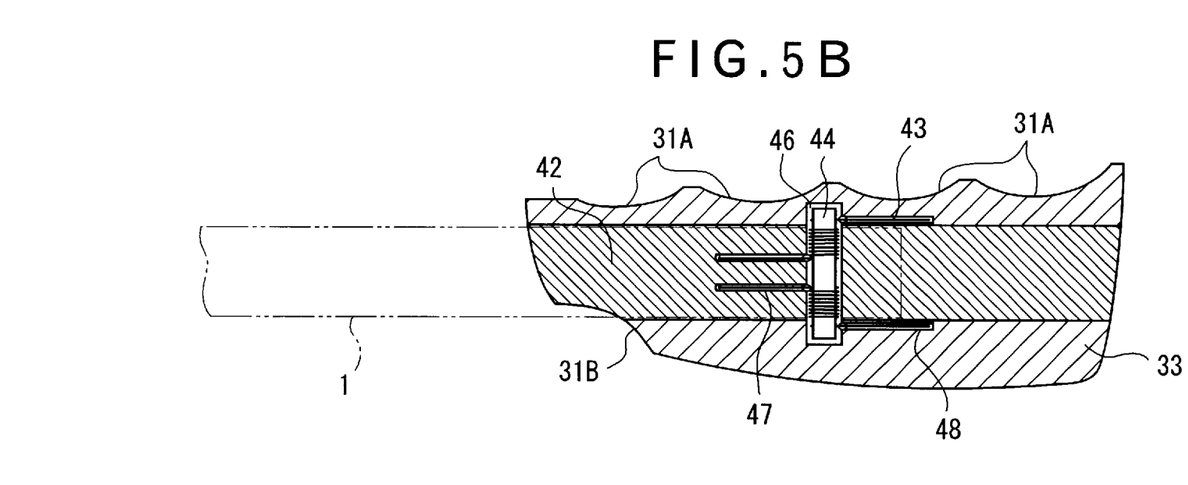

FIG. 5 shows a cross section of a grip 30 according to fourth embodiment of the present invention. A feature of the fourth embodiment is a provision of a turnable movable member 42.

Specifically, the component 33 of the grip 30 is separated in the longitudinal direction thereof approximately at the width center to form the movable member 42. A groove 45 of U-shaped cross section is provided at approximately longitudinal center thereof along the entire width direction. A turn shaft 44 is accommodated in the groove 45 of U-shaped cross section. Two coil springs 43 as biasing means are helically wound around the cylindrical surface of the turn shaft 44.

In assembling the grip, after one end (center side end in FIG. 5) of the coil spring 43 is inserted to the through hole 47 provided on the movable member 42, the turn shaft 44 is fitted to the groove 45 of the U-shaped cross section. Then, simultaneously with inserting the other end of the coil spring 43 to an insert hole 48 provided on the component 33, the turn shaft 44 is fitted to a groove 46 of U-shaped cross section provided on the component 33. At this time, the one end of the movable member 42 is pressed to the main scale 1 by virtue of the biasing force of the coil spring 43.

According to the above arrangement, when a side of the movable member remote from the slider 11 relative to the turn shaft 44 is turned toward the second through hole 34B, the slide surface of the movable member 42 against the main scale 1 on the slider 11 side relative to the turn shaft 44 is moved away from the back surface of the main scale 1.

When the grip 30 is moved on the main scale 1 during measurement, the movable member 42 is turned by the finger of the hand holding the grip 30 against the coil spring 43 (see double-dotted line in FIG. 5) to eliminate biasing force of the movable member relative to the main scale 1. The grip 30 is moved in the condition, and, when the grip 30 is moved to an appropriate position, the finger is released from the movable member 42. Then, the movable member 42 is turned by the coil spring 43 to be in contact with the main scale, where measurement is conducted.

According to the fourth embodiment, following advantages as well as the above advantages (1) to (6) can be obtained.

(11) Since it is not necessary to slide the movable member 42 relative to the main scale 1 in moving the grip 30, the grip 30 can be moved with a light force and no anti-friction problem occurs.

[Fifth Embodiment]

Figure 6A:
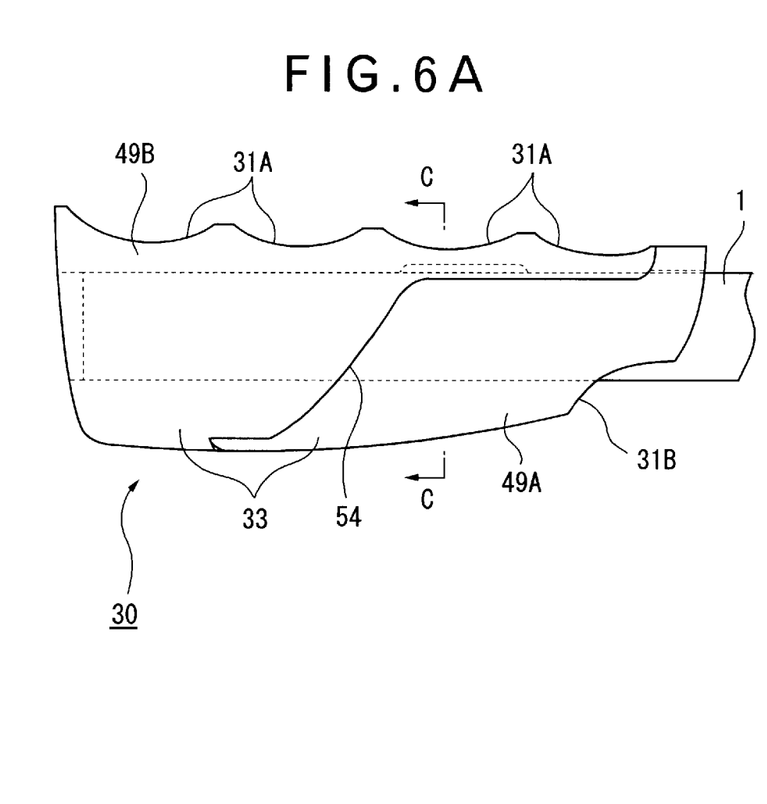
FIG. 6(A) is a rear elevational view of the primary portion.
Figure 6B:
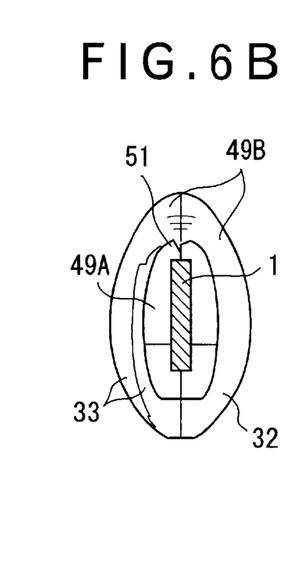
FIG. 6(B) is a side elevational view thereof and FIG. 6(C) is a cross section taken along C—C line in FIG. 6(A)
Figure 6C:
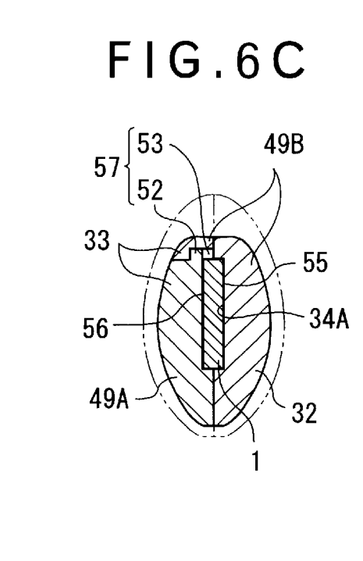
Figure 7:
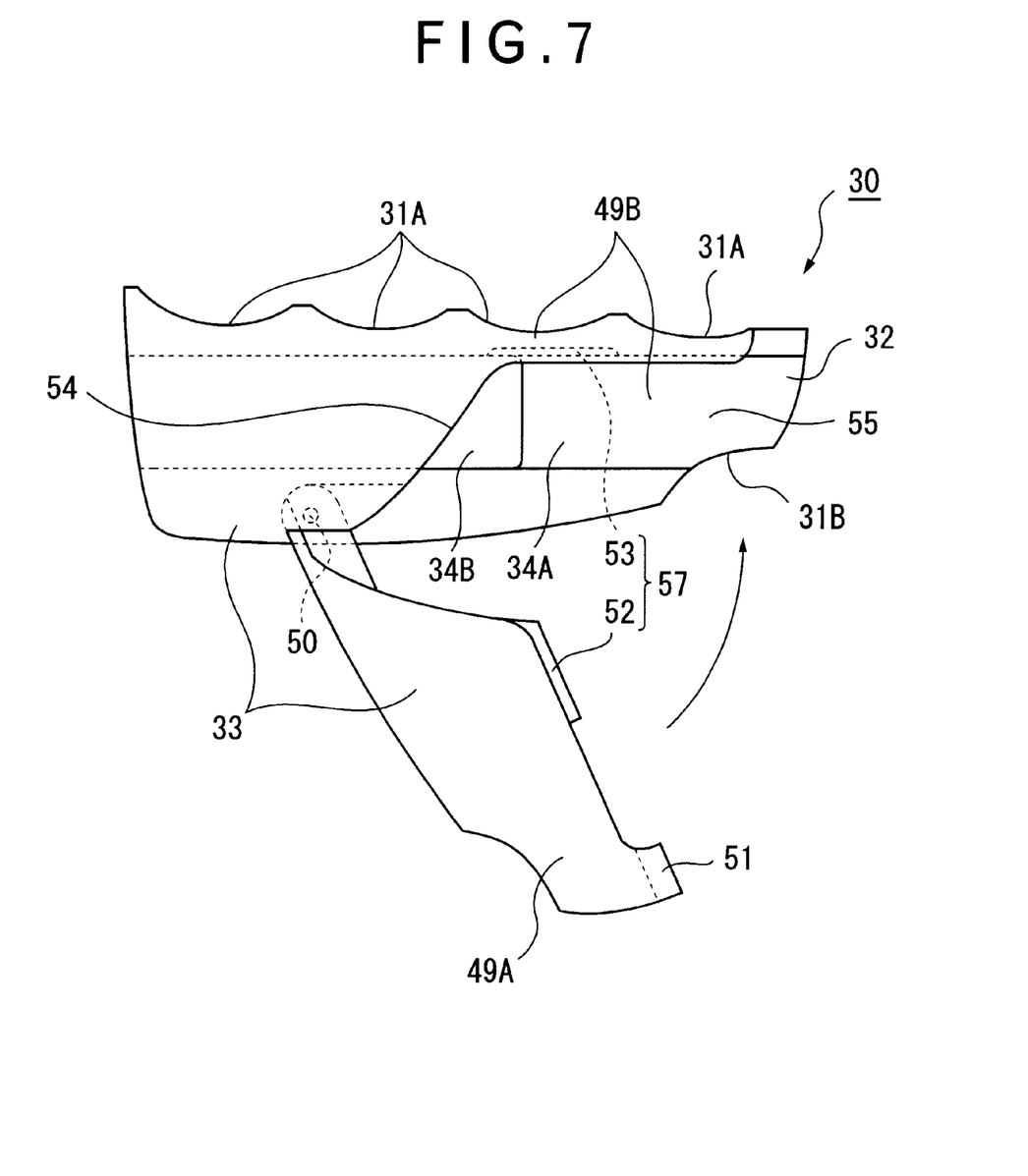
FIG. 7 is an illustration showing a caliper grip according to the fifth embodiment of the present invention.

FIGS. 6 and 7 are illustrations of grip 30 according to fifth embodiment. A feature of the fifth embodiment is that the grip 30 can be post-attached to an existing caliper.

Specifically, a pair of holding portions 55 and 56 for holding the main scale 1 in depth direction and being slidable relative to the main scale 1 is provided to the tube-shaped grip body covering the main scale 1, i.e. the inside (inner opposing sides with the first through hole 34A therebetween) of the components 32 and 33 constituting the grip body.

First grip component 49A of approximate diamond-shape including a first holding portion 56 of the holding portions 55 and 56 is separated from the component 33 from a parting line 54 and is turnable relative to the component 33 through a turn shaft 50. In other words, the first grip component 49A is displaceable in a direction for the first holding portions 56 and a second holding portion 55 are separated (up and down direction in FIG. 7) relative to a second grip component 49B (the component 32 and the component 33 except for the first grip component 49A). Accordingly, when the holding portion 56 is displaced to the lower direction in FIG. 7 relative to the holding portion 55, one side of the first through hole 34A is opened, through which the other end of the main scale 1 can be inserted to the second through hole 34B.

A fitting 57 for engaging the first grip component 49A and the second grip component 49B while holding the main scale 1 by the pair of holding portions 55 and 56 is provided between the first grip component 49A and the second grip component 49B (the component 32 and the component 33 except for the first grip component 49A). The fitting 57 is composed of a recess 53 on the second grip component 49B formed on the upper wall of the first through hole 34A and a projection 52 provided on the upper end of the first grip component 49A to be engaged with the recess 53. The positional relationship between the recess 53 and the projection 52 is set so that the pair of holding portions 55 and 56 hold the main scale 1 with a predetermined force (force capable of sliding and stopping the grip 30) when the projection 52 is engaged in the recess 53. In other words, the positional relationship between the recess 53 and the projection 52 is set so that the projection 52 engages with the inside of the recess 53 while causing slight elastic deformation of the first grip component 49A when the pair of holding portions 55 and 56 hold the main scale 1 with a predetermined force. Incidentally, a claw 51 to be engaged with the upper end of the main scale 1 when the projection 52 engages with the inside of the recess 53 is integrally formed on the upper end of the first grip component 49A.

In the above arrangement, the first grip component 49A is elastically deformed in a direction (depth direction of the main scale 1) away from the main scale 1 so that the claw 51 of the first grip component 49A is detached from the upper end of the main scale 1. In this condition, the first grip component 49A is turned (clockwise in FIG. 7). Then, a side of the first through hole 34A is opened, from which the other end of the main scale 1 is inserted to the second through hole 34B. The first grip component 49A is turned in a direction to return to original condition (anticlockwise in FIG. 7) so that the projection 52 of the first grip component 49A is engaged with the inside of the recess 53 and the claw 51 is engaged with the upper end of the main scale 1. Then, the clockwise (in FIG. 7) turn of the first grip component 49A is restricted by the claw 51 and the pair of holding portions 55 and 56 hold the main scale 1, so that the grip 30 can be stopped at a desired position relative to the main scale 1 in measuring dimension and can be moved with relatively low force during movement.

According to the fifth embodiment, following advantages as well as the above advantages (1) to (6) can be obtained.

(12) The grip 30 can be attached and detached to various existing calipers after being assembled.

(13) Since the clamp force of the pair of holding portions 55 and 56 is changed according to deformation of the first grip component 49A and the second grip component 49B when the grip 30 is attached to the main scale 1, the grip 30 can be set so that the grip 30 is stilled while measuring dimension and moved with relatively low force during movement.

(14) Since the grip 30 is composed of only three components of the component 32, the grip components 49A and the component 33 except for the grip component 49A, little trouble is necessary for assembling the grip.

Incidentally, the scope of the present invention is not restricted to the calipers described with reference to above embodiments, but includes following modifications.

For instance, the grip 30 may be rectangular solid and multiple projections may be provided on the surface thereof. In other words, the shape of the grip 30 is not limited.

The material of the grip 30 may not be plastic. For instance, other material such as rubber may be used. Rubber having appropriate rigidity deforms when being gripped by hand to clamp the main scale 1 and returns to the original shape when the hand is released to eliminate the clamp force to the main scale 1. Other alternative materials for the grip may be wood and aluminum. Wood is as light as plastic and much air is included in the fibers thereof, so that heat insulation thereof is superior. The aluminum has low specific gravity of one third of steel and the color thereof is similar to the main scale 1 and the slider 11, so that appearance unity can be generated to express luxury touch.

Further, in the first to third embodiments, the main scale 1 may not be sandwiched in connecting the components 32 and 33, but the component projecting in the thickness direction of the other end of the main scale 1 may be detached and the main scale 1 may be inserted to a hole of an integrally-molded tube-shaped grip 30, and the detached component may be attached again. Accordingly, the number of the components can be reduced as compared to an arrangement connecting the two components 32 and 33.

The grip 30 may be fixed by inserting a male screw into a female crew formed in the grip 30 from the outside of the grip 30 and directly screwing the main scale 1 by the male screw. The male screw may be loosened in moving the grip. Accordingly, the grip 30 can be moved without sliding against the main scale 1 and the slide member 39 is not necessary to be provided, thereby reducing production cost.

Though the rib 38 and the plate spring 37 are provided to the component 33 in the above embodiments, the rib and plate spring may be provided on the component 32.

The shape of the rib 38 may not be semi-cylindrical in the second embodiment. For example, the shape may be rectangular solid, which may be any shape as long as the rib can be slid with relatively low force. Though a projection integrally molded with the movable member 42 is formed on the movable member 42 in the fourth embodiment, the shape of the projection may not be semi-cylindrical. Any shape of the projection may be used as long as the grip 30 can be stopped relative to the main scale 1 in measuring the dimension.

Though vernier scale caliper is specifically described in the above embodiments, the present invention can be applied to digital display caliper and dial display caliper.

The present invention can be used not only to the caliper but the grip of itself.

What is claimed is:

1. A caliper, comprising:
   a main scale having a first measuring jaw;
   a slider movable along a longitudinal direction of the main scale and having a second measuring jaw to be in contact with a workpiece together with the first measuring jaw; and
   a tube-shaped grip provided on a side of the main scale opposite to the measuring jaws relative to the slider, the grip being formed from a plurality of components that are attached to one another so as to cover the main scale, said grip being movable in the longitudinal direction of the main scale.

2. The caliper according to claim 1, further comprising a plate spring, said plate spring being disposed on an inner wall of the grip, and wherein said plate spring is slidable relative to the main scale when the grip is moved in the longitudinal direction of the main scale.

3. The caliper according to claim 1, further comprising a rib disposed on an inner wall of the grip and facing toward the main scale, and wherein said rib is slidable relative to the main scale when the grip is moved in the longitudinal direction of the main scale.

4. The caliper according to claim 1, further comprising a slide member, said slide member being independent of the grip and being provided between the grip and the main scale.

5. The caliper according to claim 1, further comprising a pair of holding portions, said pair of holding portions being formed inside the grip and being adapted to hold the main scale, said pair of holding portions being slidable relative to the main scale, and wherein a first grip component including a first holding portion of the pair of holding portions is displaceable relative to a second grip component including a second holding portion of the pair of holding portions in a direction for the first holding portion to move away from the second holding portion, and wherein a fitting for mutually engaging the first grip component and the second grip component when the main scale is held by the pair of holding portions is provided.

6. A caliper, comprising:

a main scale having a first measuring jaw;

a slider movable along a longitudinal direction of the main scale and having a second measuring jaw to be in contact with a workpiece together with the first measuring jaw; and a tube-shaped grip provided on a side of the main scale opposite to the measuring jaws relative to the slider, the grip covering the main scale and being movable in the longitudinal direction of the main scale, wherein the grip includes a grip body covering at least a part of the main scale and a movable member turnably supported by the grip body through a turn shaft and having an end adapted to be in contact with the main scale, and a biasing means for biasing the movable member in a direction for the end of the movable member to be in contact with the main scale.

7. A caliper grip used for a caliper including a main scale having a first measuring jaw and a slider movable along a longitudinal direction of the main scale having a second measuring jaw to be in contact with a workpiece together with the first measuring jaw, wherein the caliper grip is movable on the main scale and stoppable at a desired position on the main scale, the caliper grip being formed from a plurality of components that are attached to one another and cooperate to define a tube-shaped covering having a through hole in which the main scale is received.

8. The caliper grip according to claim 7, further comprising a pair of holding portions, said pair of holding portions being formed inside the grip and being adapted to hold the main scale and slidable relative to the main scale, and wherein a first grip component including a first holding portion of the pair of holding portions is displaceable relative to a second grip component including a second holding portion of the holding portions in a direction for the first holding portion to move away from the second holding portion, and wherein a fitting for mutually engaging the first grip component and the second grip component when the main scale is held by the pair of holding portions is provided.

* * * * *